(No Model.)

R. RICHTER.
RUBBER DAM CLAMP.

No. 562,490.   Patented June 23, 1896.

Witnesses:
Dr. O. Hoffmann
Dr. William Lombardus

Inventor.
Robert Richter

UNITED STATES PATENT OFFICE.

ROBERT RICHTER, OF BERLIN, GERMANY.

RUBBER-DAM CLAMP.

SPECIFICATION forming part of Letters Patent No. 562,490, dated June 23, 1896.

Application filed March 2, 1895. Serial No. 540,388. (No model.) Patented in Germany December 7, 1894, No. 34,729, and in England January 30, 1895, No. 2,141.

*To all whom it may concern:*

Be it known that I, ROBERT RICHTER, dentist, a subject of the King of Prussia, Emperor of Germany, residing in Berlin, Germany, have invented and constructed a new and useful Improvement in Dental Clamps, (patented in Great Britain January 30, 1895, No. 2,141, and in Germany December 7, 1894, No. 34,729,) of which the following is a specification.

My invention relates to an improvement consisting of a flexible-wire arrangement on metallic dental clamps in use heretofore; the same being employed to hold or retain wadding rolls to both sides of the teeth while filling. The said flexible-wire attachment is soldered, riveted, or in any other manner fastened to the stiff metallic shanks of any ordinary rubber-dam clamp, carrying wadding rolls to protect the teeth from saliva during the process of inserting fillings and excavating teeth-cavities. Owing to the flexibility of these wire prolongments, it is possible to bend the same so as to suit any rows of teeth or curves of the jaw and at the same time to avoid unnecessary pressure against the teeth, and most especially to keep such teeth dry, as will not admit the adjustment of any ordinary clamp.

Figure 1:
Figure 2:
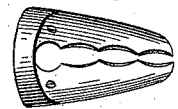

In the accompanying drawings, Figure 1 represents a simple ordinary clamp in general use to back or hold rubber dam in place. Fig. 2 shows also an ordinary clamp serving the same purpose as that shown in Fig. 1, with the exception that the shanks of the clamp are longer and provided with more curves devised to clasp more than one tooth at the same time.

The shanks of the clamps in Figs. 1 and 2 being generally of steel and stiff, cannot be shaped to suit the different curves and rows of teeth in the mouth. Owing to the absence of my improvement on rubber-dam clamps existing, it is impossible to hold or retain wadding rolls firmly to the teeth.

Figure 3:
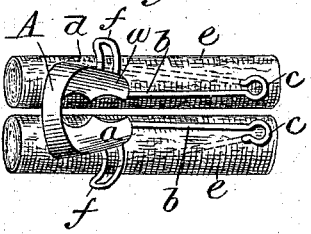
Figure 4:
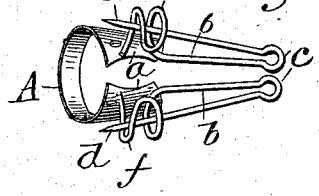

Figs. 3 and 4 represent steel clamps of the form shown in Fig. 1 provided with my improvement. Fig. 3 presents an upper view with wadding rolls attached, whereas Fig. 4 shows a lower view without wadding rolls.

In Figs. 3 and 4 similar letters have reference to like parts.

The steel clamp A has attached at its shanks $a$ the wires $b\ b$. The latter are bent backward as shown at $c$ and pointed at their ends (see Fig. 4) for the purpose of piercing the wadding rolls $e$ thereon, as shown by dotted lines in Fig. 3. The said flexible wires $b\ b$ may be soldered, riveted, or in any other manner fastened to any part of the steel clamp A. To the outside of the shanks $a\ a$ are also soldered or riveted hooks or bows $f\ f$ for the purpose of retaining the wadding rolls securely in place under the same when pierced on the flexible wires $b\ b$, as shown in Fig. 3. The said flexible wires can be entirely straight, instead of being bent backward at $c$, in which case the hooks or bows $f$ may be dispensed with. These hooks or bows may be attached separately to the shanks of the steel clamp A, or the entire attachment be bent out of the same piece of wire, as is shown in Fig. 4.

My improvement is not limited to the clamps shown in Figs. 1 and 2, but can be attached, as before stated, to any ordinary metallic rubber-dam clamp now in use.

The material employed for the wire prolongment must be entirely flexible, preference given to platinum, but copper or any other flexible metal may be used. The softness and flexibility of this wire arrangement makes it possible to adjust the appliance to suit the curves or rows of teeth in any jaw, especially in very difficult cases, where the teeth to be filled will not endure the ordinary clamp, or permit the adjustment of rubber dam or ligature to isolate and lay dry, as is often the case with the second and third molars in the lower maxilla, and where on the buccal side of such teeth the soft parts on the ascending ramus often present an insuperable impediment. To lay such teeth dry, my improved clamp is attached to a more distant tooth, which is able to bear a clamp, the prolongment with the wadding rolls extending to and keeping dry the tooth or root in question.

What I claim, and desire to secure by Letters Patent of the United States, is—

1. An improvement on rubber-dam dental clamps consisting of wire attachments of soft flexible metal, such as copper, platinum, &c., soldered or riveted or in any other manner fastened on any place to the shanks of ordinary clamps; the said wire attachments being straight or bent backward and pointed at the ends so as to enable wadding rolls to be pierced thereon, as shown for instance in Fig. 3, and which may be bent to suit and accommodate all curves and rows of teeth in the jaws, for the purpose of keeping the teeth perfectly dry as described.

2. An improvement on rubber-dam dental clamps consisting of wire attachments of soft flexible metal, such as copper, platinum, &c., soldered, riveted or in any other manner fastened on any place to the shanks of ordinary clamps, the said wire attachments being straight or bent backward and pointed at the ends to pierce wadding rolls, in combination with curved bows or hooks attached to either side of the shanks of the ordinary rubber-dam clamp for the purpose of retaining and holding the wadding rolls pierced on the wire attachments aforesaid firmly and securely in place.

In testimony that I claim the foregoing as my own I have hereto affixed my signature in presence of two witnesses.

ROB. RICHTER.

Witnesses:
WILLIAM LOMBARDINO,
OTTO HOFFMANN.